United States Patent [19]

Büchel et al.

[11] 4,177,729
[45] Dec. 11, 1979

[54] METHOD FOR THE PRODUCTION MARKING OF LIQUID DISPLAYS

[75] Inventors: Erwin Büchel, Ennetbaden; Ruurd de Fluiter, Zurich; Peter J. Wild, Wettingen; Jörg Wullschleger, Mulligen, all of Switzerland

[73] Assignee: BBC Brown Boveri & Company, Limited, Baden, Switzerland

[21] Appl. No.: 829,482

[22] Filed: Aug. 31, 1977

[30] Foreign Application Priority Data

Nov. 24, 1976 [CH] Switzerland .................. 14746/76

[51] Int. Cl.² .................................... B41F 15/34
[52] U.S. Cl. .................. 101/129; 350/343; 428/1; 101/368; 101/127

[58] Field of Search ............ 350/343; 428/1; 101/129, 127, 127.1

[56] References Cited

U.S. PATENT DOCUMENTS

| 3,894,487 | 7/1975 | Miller | 101/129 |
|---|---|---|---|
| 3,987,725 | 10/1976 | Scantlin | 101/129 X |
| 3,995,941 | 12/1976 | Nagahara et al. | 350/343 |

*Primary Examiner*—William Pieprz
*Attorney, Agent, or Firm*—Oblon, Fisher, Spivak, McClelland & Maier

[57] ABSTRACT

A method for the production marking of liquid crystal displays whereby the closure bar of the liquid crystal cell is produced and encoded by a screen printing process. Several coding techniques which minimize production interruptions are also disclosed.

24 Claims, 4 Drawing Figures

| Wo | 3a | 3b | 3c | 3d | 3e | 3f | 3g | 3h |
|---|---|---|---|---|---|---|---|---|
| 01 | 1 | 0 | 0 | 0 | 0 | 0 | 0 | 0 |
| 02 | 1 | 1 | 0 | 0 | 0 | 0 | 0 | 0 |
| 03 | 1 | 1 | 1 | 0 | 0 | 0 | 0 | 0 |
| 04 | 1 | 1 | 1 | 1 | 0 | 0 | 0 | 0 |
| 05 | 0 | 0 | 0 | 0 | 1 | 0 | 0 | 0 |
| 06 | 1 | 0 | 0 | 0 | 1 | 0 | 0 | 0 |
| 07 | 1 | 1 | 0 | 0 | 1 | 0 | 0 | 0 |
| 08 | 1 | 1 | 1 | 0 | 1 | 0 | 0 | 0 |
| 09 | 1 | 1 | 1 | 1 | 1 | 0 | 0 | 0 |
| 10 | 0 | 0 | 0 | 0 | 0 | 1 | 0 | 0 |
| etc. | | | | | | | | |

FIG.3

| Wo | 3a | 3b | 3c | 3d | 3e | 3f | 3g | 3h | 3i | 3k |
|---|---|---|---|---|---|---|---|---|---|---|
|  | 0 | 0 | 0 | 0 | 0 | 0 | 0 | 0 | 0 | 0 |
| 01 | 1 | 0 | 0 | 0 | 0 | 0 | 0 | 0 | 0 | 0 |
| 02 | 1 | 1 | 0 | 0 | 0 | 0 | 0 | 0 | 0 | 0 |
| 03 | 1 | 1 | 1 | 0 | 0 | 0 | 0 | 0 | 0 | 0 |
| 04 | 1 | 1 | 1 | 1 | 0 | 0 | 0 | 0 | 0 | 0 |
| 05 | 0 | 0 | 0 | 0 | 1 | 0 | 0 | 0 | 0 | 0 |
| 06 | 1 | 0 | 0 | 0 | 1 | 0 | 0 | 0 | 0 | 0 |
| 07 | 1 | 1 | 0 | 0 | 1 | 0 | 0 | 0 | 0 | 0 |
| 08 | 1 | 1 | 1 | 0 | 1 | 0 | 0 | 0 | 0 | 0 |
| 09 | 1 | 1 | 1 | 1 | 1 | 0 | 0 | 0 | 0 | 0 |
| 10 | 0 | 0 | 0 | 0 | 0 | 1 | 0 | 0 | 0 | 0 |
| etc. | | | | | | | | | | |
| 52 | 1 | 1 | 0 | 0 | 0 | 1 | 1 | 1 | 1 | 1 |

FIG.4

METHOD FOR THE PRODUCTION MARKING OF LIQUID DISPLAYS

BACKGROUND OF THE INVENTION

1. Field of the Invention

The invention relates to a method for the production marking of liquid crystal displays (LCD) whereby the closure bar of the liquid crystal cell is produced by the screen printing process.

2. Description of the Prior Art

Liquid crystal displays have typically been formed by sandwiching a liquid crystal material between transparent plates. A closure bar, formed by screen printing, has typically been used to seal the peripheral edges of the sandwich. Such a liquid crystal display is illustrated in U.S. Pat. No. 3,995,941 in which the closure bar is a low melting point glass, the disclosure of which is hereby incorporated by reference.

Liquid crystal displays have hitherto generally been marked by means of a lettering machine so that the week number and year of manufacture were printed on them. This lettering is necessary in order to ensure watch identification for customer warranty purposes. With a fairly large production volume, a plurality of lettering machines with a plurality of operators must be employed, otherwise a production bottleneck can result.

Recently it has been proposed to superimpose a production code in the photoresist process for the segmentation of the electrode layer. But this involves two difficulties:

(a) The exposure occurs by multiple process, so that a corresponding multiple pattern must be typed and produced once per week;

(b) Several weeks may elapse between electrode segmentation and further processing.

SUMMARY OF THE INVENTION

Accordingly, one object of this invention is to provide a novel method for the production marking of liquid crystal displays which obviates the above-described difficulties.

Another object of this invention is to develop a method whereby the step of production marking coincides approximately with the decisive step of the manufacturing process.

These and other objects of the present invention are achieved by providing the screen used to print the closure bar of a liquid crystal display with an information code relating to period of manufacture, so that the closure bar is marked with the same code during printing.

Compared to previous methods, the coding system according to this invention has the advantage that only a few patterns are printed per screen printing operation, and that in any event normal wear of the screen necessitates relatively frequent screen renewal, at which time it is advantageous to update the screen coding. Furthermore, experience shows that details of graphics and cell technology are subject to modifications at fairly short intervals, so that unmistakable identification is possible with a minimum of coding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a table relating to the programming of the code projection openings of FIG. 1; and FIG. 4 is a table relating to another programming embodiment for code projection openings.

DETAILED DESCRIPTION OF THE PREFERRED EMBODIMENTS

Figure 1:
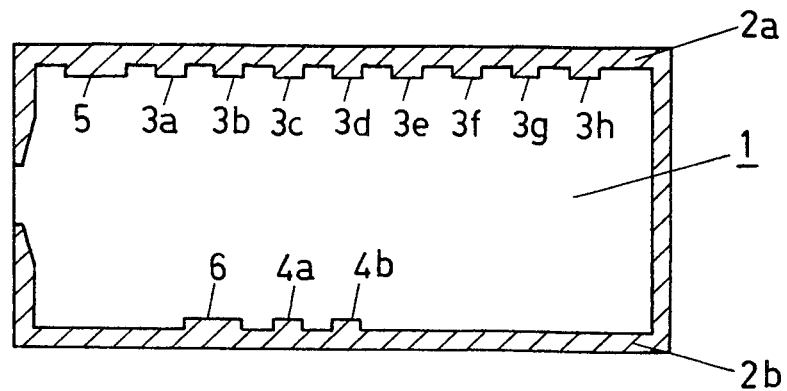
FIG. 1 is a view of a screen geometry with code projections representative of a production marking.

Referring now to the drawings, wherein like reference numerals designate identical or corresponding parts throughout the several views, and more particularly to FIG. 1 thereof, a screen geometry 1 is provided for a closure bar 2a and 2b in which all the code cams projections 3a-3h and 4a-4b are initially open. (Open corresponds to binary '0'). The programming of the code is done by selective masking of specific code openings using masking paint.

To enable the week code to be marked, six bits are required in the dual binary system. Two bits, corresponding to a four year cycle, are generally sufficient for the year code. In a practical embodiment, it is advantageous for technological reasons to employ a specific week code. Therefore the code provided is not a straight dual binary code ($2^n$ code), but a code according to the table shown in FIG. 3. In the code shown in FIG. 3, the four least significant bits 3a, 3b, 3c and 3d, are changed consecutively, that is, one opening is closed after the other. The corresponding cycle covers approximately one month. "Wo" in FIG. 3 denotes the week number. The four most significant bits 3e, 3f, 3g, 3h, of the table shown in FIG. 3 represent the month of the year, and are coded as a dual binary code. After the expiration of the four week cycle represented by the least significant bits 3a, 3b, 3c, 3d, the monthly binary code 3e, 3f, 3g, 3h, is increased by one unit. This embodiment has the advantage that with a minimum of bits, only a few already programmed screens become unserviceable at the weekly exchange. On the average, the opening of previously closed code projections would only be necessary at one fifth of the week changes. Because this is technologically difficult, the screens already programmed are replaced in these cases if necessary.

FIG. 1 illustrates an embodiment wherein the weekly code 3a . . . 3h is applied along the one edge 2a of the closure bar, while the yearly code (dual binary code) 4a, 4b is arranged along the opposite edge 2b of the closure bar 1. This facilitates the reading of the entire code. Furthermore, projections 5 and 6 are used to define the starting points of weekly code 3a . . . 3h and yearly code 4a, 4b respectively. Projections 5 and 6 are designed to be twice as long as the projections 3 and 4 in order that the code starting point can be easily distinguished.

Figure 2:
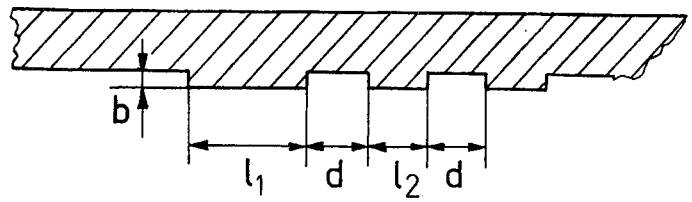
FIG. 2 is a detailed view of code projection openings in a screen for glass solder paste printing.

Typical dimensions of the code cam openings in the screen for glass solder paste printing are, according to FIG. 2:

b = 0.1 mm
$l_1$ = 1.0 mm
$l_2$ = 0.5 mm
d = 0.5 mm

The width b is chosen minimum so as not to restrict appreciably the field used for the display. It is advantageous to apply a projection of e.g. double length $l_1$ as reference mark in order to define the starting point.

The table shown in FIG. 4 represents a code more easily legible than table 1, although it requires 10 bits for the week identification. Here the first 4 bits 3a to 3d together with the bit 3e embody the units of the week number and the remaining bits the tens of the week number. Once again, the heading "Wo" in Table 4 denotes the week number.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the production marking of a liquid crystal display having a closure bar, said closure bar surrounding the area in which the liquid crystal is to be displayed and sealing said liquid crystal in said display, comprising:
   providing a printing screen whose geometry includes said closure bar, wherein at least one sequence of projections which form a code projects from said closure bar; and
   print forming said closure bar by use of said screen wherein the geometry of each of said sequence of projections simultaneously forms a portion of the geometry of said closure bar thereby coding said closure bar.

2. A method according to claim 1, further comprising the step of:
   using a binary code for said code.

3. The method of claim 1 wherein said code is programmed on said screen by selectively masking initially open code projection openings.

4. A method according to claim 3, wherein said step of selectively masking is performed by the additional step of:
   applying masking paint to said initially open code projection openings.

5. A method according to claim 24, further comprising the steps of:
   providing one end of each said sequence of code projections with a starting projection which differs clearly in length from said code projections, and
   using said starting projection as a reference mark to define the code starting point.

6. A method according to claim 5, comprising the additional step of: defining said starting projections to be twice as long as said code cams.

7. A method according to claim 1, comprising the additional steps of:
   applying a weekly code along one edge of the closure bar, and
   applying a yearly code along the opposite edge of the closure bar.

8. A method according to claim 7, wherein said yearly code is derived by the additional step of:
   using a binary code.

9. A method according to claim 7, wherein said weekly code is applied to said liquid crystal cell by the steps of:
   programming the screen gemotry with 8 initially open code projections, each of said projections corresponding to one code bit,
   using said 8 bits to define said weekly code, said 8 bits being grouped into 2 groups of 4 bits each having a particular meaning,
   selectively and cyclically masking in order each week succeeding ones of said code projections corresponding to a first group of said bits,
   defining said second group of bits as part of a dual binary code,
   incrementing said dual binary code upon completion of each cycle of said first group of bits by selectively masking succeeding ones of said code projections corresponding to said second group of bits, and
   leaving open all code projections corresponding to said 8 code bits every 52 weeks.

10. A liquid crystal display produced by the method of claim 9.

11. A method according to claim 7, wherein said weekly code is applied to said liquid crystal cell by the steps of:
   programming the screen geometry with 10 initially open code projections each of said code projections corresponding to one of 10 code bits,
   using said 10 bits to define said weekly code in decimal notation, said 10 bits being grouped into two groups of 5 bits, each having a particular meaning, said first group determines the units of said week code and said second group determines the tens of said week code,
   selectively and cyclincally masking in order each week succeeding ones of said code projections corresponding to four of said 5 first group bits,
   cyclically masking the code cam corresponding to the fifth of said 5 first group bits upon completion of the four week projection masking cycle performed on said code projections corresponding to said 4 of said first group bits,
   selectively and cyclically masking in order selective ones of said code projections corresponding to said 5 second group bits upon completion of the 10 week masking cycle of said 5 first group unit bits,
   leaving open all projection codes corresponding to the 10 code bits every 52 weeks.

12. A liquid crystal display produced by the method of claim 11.

13. A liquid crystal display produced by the method of claim 7.

14. A liquid crystal display produced by the method of claim 1.

15. A liquid crystal display which comprising in combination: a closure bar surrounding said display for sealing a liquid crystal cell, said closure bar produced by a screen printing process, and a marking formed by said screen enabling the identification of certain production data, said marking constituted by projections projecting out of said closure bar in a coded sequence said coded sequence containing said identification of production data, said projections having been printed simultaneously with the printing of said closure bar.

16. A liquid crystal display according to claim 15 wherein said sequence of said projections is coded according to a binary code, the presence or absence of a projection representing the values of a binary digit.

17. A liquid crystal display according to claim 16 with said coded closure bar containing information as to the period of production wherein said projections along one edge of said closure bar represent information as to the week, while said projections along the opposite edge of said closure bar represent information as to the year of production.

18. A liquid crystal display according to claim 16 wherein said sequence of code projections is preceded by a starting projection which differs clearly in length from said code projection and which serves as a reference mark to define the code starting point.

19. A liquid crystal display according to claim 18 wherein said starting projection is twice as long as each of said code projections.

20. A liquid crystal display according to claim 17 wherein an array of eight of said code projections are provided to represent eight bits for coding the number of the week of production, said eight bits being divided in a first group of four successive bits and a second group of four successive bits, the successive bits of said first group defining successive weeks of a five weeks cycle and the successive bits of said second group defining the number of a five weeks cycle.

21. A liquid crystal display according to claim 17 wherein an array of ten of said code projections are provided to represent ten bits for coding the number of the week of production, said ten bits being divided in a first group of five successive bits and a second group of five successive bits, four successive bits of said first group defining successive weeks of a five weeks cycle and the fifth bit of said first group defining the first or the second half of a ten weeks cycle, and the five successive bits of said second group defining the successive ten weeks cycles defined by the bits of said first group.

22. A liquid crystal display according to claim 20 wherein a second array of two code projections are provided along the opposite edge of said closure bar from said first array to represent two bits for coding the number of the year of production within a four years cycle.

23. A liquid crystal display according to claim 17 wherein said sequence of code projections is preceded by a starting projection which differs clearly in length from said code projection and which serves as a reference mark to define the code starting point.

24. A liquid crystal display according to claim 21 wherein a second array of two code projections are provided along the opposite edge of said closure bar from said first array to represent two bits for coding the number of the year of production within a four years cycle.

* * * * *